United States Patent
Henderson et al.

(10) Patent No.: US 10,357,130 B2
(45) Date of Patent: Jul. 23, 2019

(54) EXPANDABLE ROASTING PLATFORM

(71) Applicants: Daniel D. Henderson, Gainesville, FL (US); Timothy J. Henderson, Gainesville, FL (US); Eric Daniels, Gainesville, FL (US); Gwendolyn L. Daniels, Gainesville, FL (US)

(72) Inventors: Daniel D. Henderson, Gainesville, FL (US); Timothy J. Henderson, Gainesville, FL (US); Eric Daniels, Gainesville, FL (US); Gwendolyn L. Daniels, Gainesville, FL (US)

(*) Notice: Subject to any disclaimer, the term of this patent is extended or adjusted under 35 U.S.C. 154(b) by 223 days.

(21) Appl. No.: 15/442,751

(22) Filed: Feb. 27, 2017

(65) Prior Publication Data

US 2018/0242782 A1   Aug. 30, 2018

(51) Int. Cl.
A47J 37/06 (2006.01)
A47J 37/04 (2006.01)
A47J 36/02 (2006.01)

(52) U.S. Cl.
CPC ............. *A47J 37/049* (2013.01); *A47J 36/02* (2013.01); *A47J 37/0694* (2013.01); *A47J 37/067* (2013.01)

(58) Field of Classification Search
CPC ..... A47J 37/049; A47J 37/067; A47J 37/0694
USPC .................. 99/445, 449, 450, 441
See application file for complete search history.

(56) References Cited

U.S. PATENT DOCUMENTS

| | | | |
|---|---|---|---|
| 3,994,213 A * | 11/1976 | Brezinski | A47J 37/10 99/441 |
| 4,121,510 A | 10/1978 | Frederick | |
| 4,857,342 A | 8/1989 | Kappes | |
| 5,009,151 A | 4/1991 | Hungerford | |
| 5,310,977 A * | 5/1994 | Stenkamp | B65D 81/264 219/727 |
| 5,628,245 A | 5/1997 | Baze | |
| 6,024,081 A * | 2/2000 | Libertini, Jr. | A47J 37/0694 126/14 |
| 2007/0272088 A1 | 11/2007 | Gomez | |
| 2014/0230666 A1* | 8/2014 | Atlaw | A47J 37/0786 99/449 |

* cited by examiner

*Primary Examiner* — Reginald Alexander
(74) *Attorney, Agent, or Firm* — Saliwanchik, Lloyd & Eisenschenk

(57) ABSTRACT

The problem of evenly cooking a food item so that all sides cook and brown evenly is solved by the use of a roasting platform that raises above rendered substances that can cause a steam and wetness to the surface of a food item. The roasting platform can be foldable or compressed, so that it takes up minimal storage space and can be deployed for use. Drain holes allow rendered substances to be more quickly separated from the surface of a food item. The same drain holes can be used as visual indicators when deploying the roasting platform to show when he folds of a roasting platform are sufficiently separated for maximum usable area and support for a weight placed thereon.

15 Claims, 5 Drawing Sheets

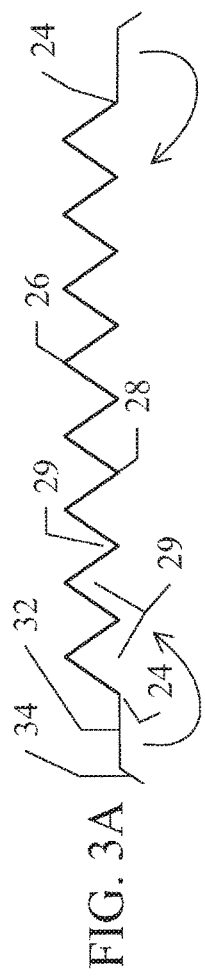
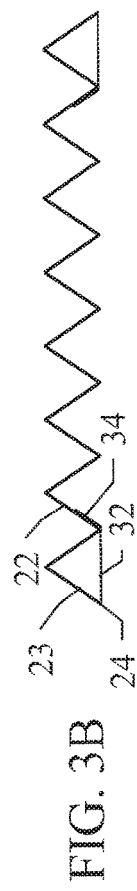
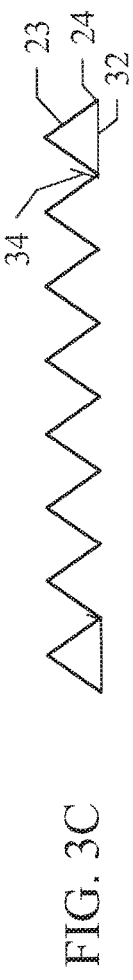
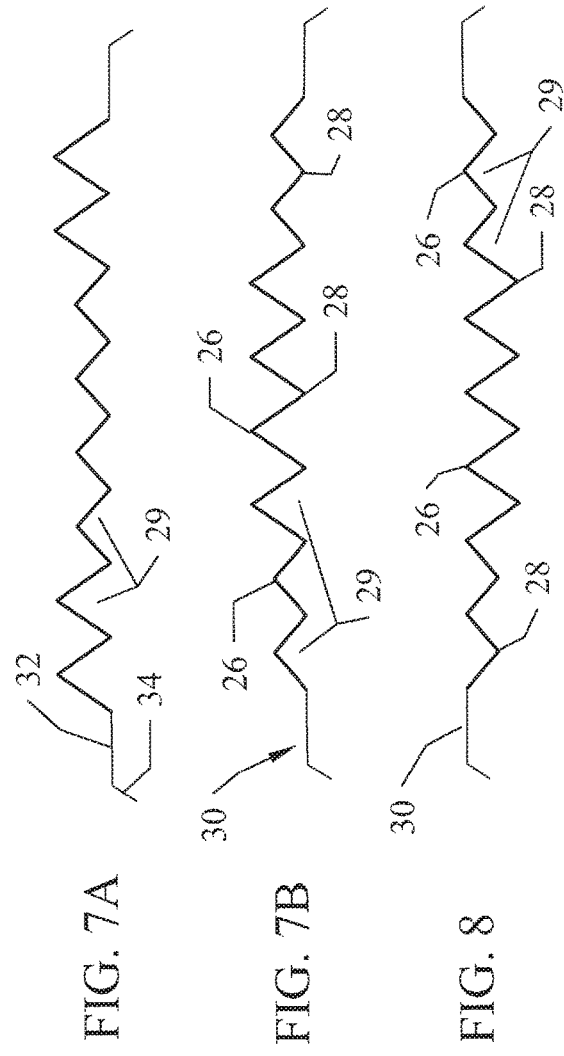
FIG. 3A
FIG. 3B
FIG. 3C
FIG. 7A
FIG. 7B
FIG. 8

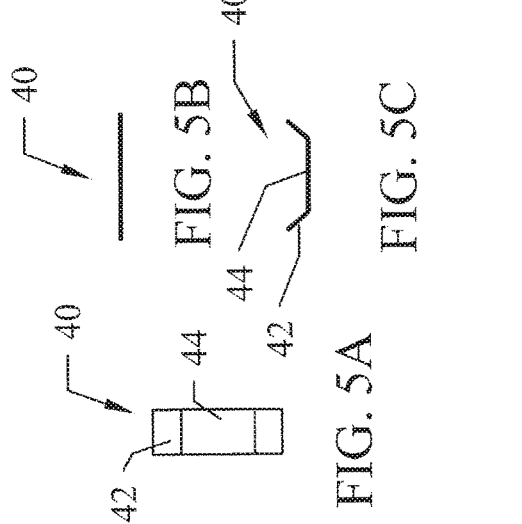
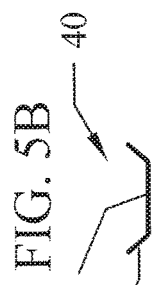
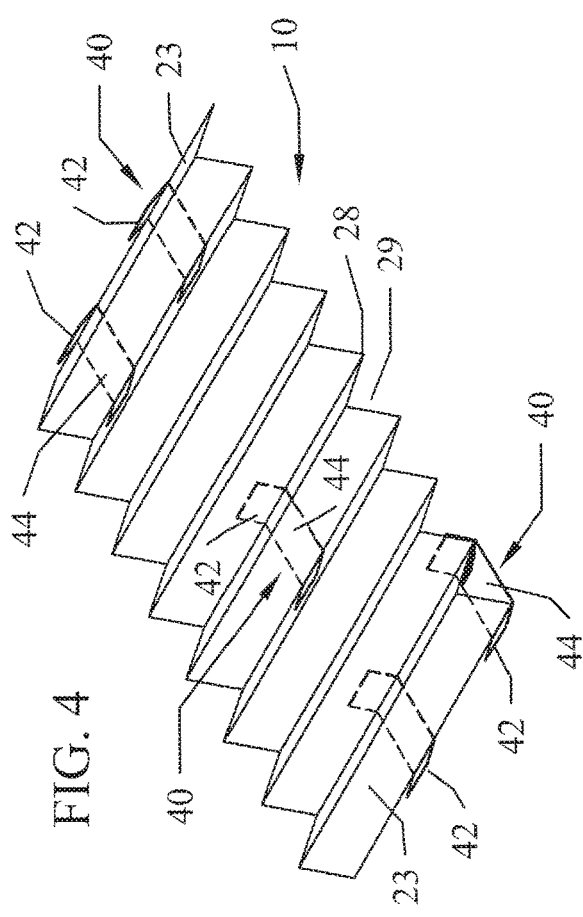
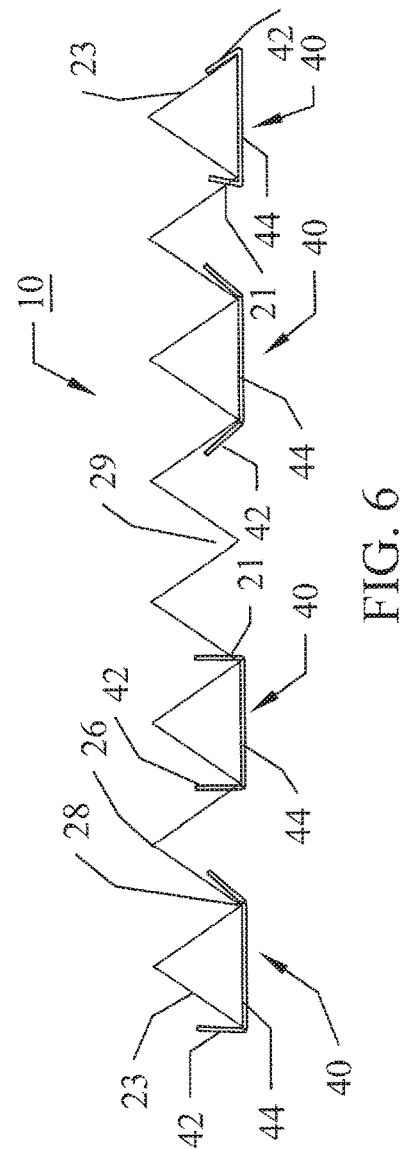

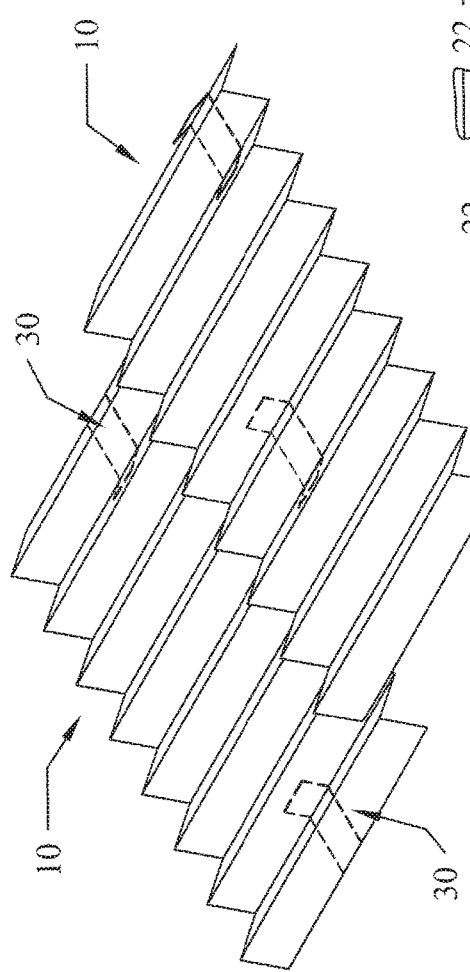
FIG. 9
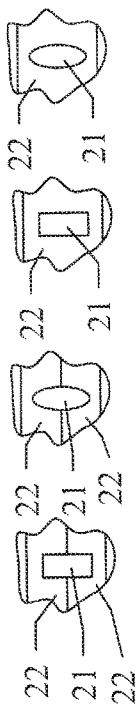
FIG. 10A
FIG. 10B
FIG. 10C
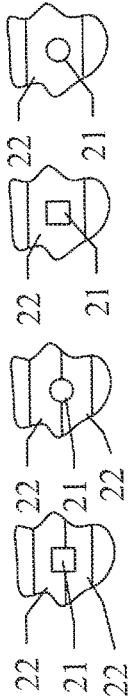
FIG. 11A
FIG. 11B
FIG. 11C

EXPANDABLE ROASTING PLATFORM

BACKGROUND OF INVENTION

Cooked foods often render fats, oils, liquids, juices, and other substances. For some foods, these rendered substances are desirable and can add to the flavor of the food or can be collected for other purposes. For other foods, it is preferable for these rendered substances to be moved away from the food while cooking. This can avoid a steaming effect and uneven cooking and encourages browning or a crisping of the outside surface. For example, meats cooked in rendered substances will often have a moist exterior, which can be desirable in some instances. If a crisp or browned exterior is preferred, the juices and other rendered substances should be moved away from the surface of the meat.

There are devices intended to raise meats or other foods above or away from the surface of a cooking pan to encourage even browning or crisping on all sides of the food. For example, there are several types of pans or trays with raised areas on which food can be place and that can be used in microwave oven to provide crisping or even cooking of foods. These devices are often made of non-metal materials and have limited weight capacity. They are usually made of materials intended to absorb the rendered substances, to be discarded along with the device. Other devices capable of supporting large food or meat products are often rigid, heavy, formed or molded devices intended to be used in conventional ovens or on barbeque pits or grills. These rigid, formed devices often have a myriad of ridges or creases that can be difficult to clean. The rigidity of the devices can also limit use to certain sizes of pans or trays. Storage of such devices can also be difficult as they may not stack or nest with other pans or trays and require extra space.

BRIEF SUMMARY

In accordance with the subject invention, the problem of cooking food items above or away from the fats, oils, liquids, juices, gases, and other substances rendered therefrom is solved by use of a roasting platform with sufficient strength to support large food items. The configuration of the roasting platform can minimize contact with the food item to promote the circulation of heat and air around all or most of the surfaces for consistent, even cooking. The roasting platform can be made of a material that inhibits absorption and allows the rendered substances to be drained away from the food item and/or collected for other uses.

Advantageously, the unique configuration of the roasting platform allows for the use of materials that can be adjusted for size. This can allow the roasting platform to be stored, displayed, shipped, or otherwise maintained in a compressed state until use, at which time it can be deployed by expanding and used in any pan or tray. Multiple roasting platforms can also be overlapped to create a larger platform, such that any pan or tray can be fitted with one or more roasting platforms, even pans or trays with curved bottom surfaces. The tab can hold the last fold at a pre-determined expanded distance and avoid a "domino effect" of collapsing folds.

Embodiments of a roasting platform comprise a sheet of folded or corrugated material that forms a repeating "M-shape" of multiple peaks and valleys. At each closed end of a roasting platform, where the last fold of the sheet is directed downwards, there can be at least one tab attached to the last fold at each end. The tabs can be bent under and across at least part of the bottom side. A tab can support the last fold at the closed ends of the roasting platform and inhibit the fold from collapsing when a large or heavy food item is placed thereon.

An alternative embodiment can have one or more separate stand members that can be used to support the bottom side of the roasting platform. Stand members can be "U-shaped" or similarly-shaped pieces having at least two substantially upwards directed braces, between which two or more folds, such as, for example, the last fold and at least one adjacent peak, can be placed to inhibit collapse of a closed end. Multiple stand members can be used under a roasting platform to impart additional strength and support.

The subject invention successfully addresses the disadvantages associated with the previously known devices for raising foods above rendered substances and provides certain attributes and advantages, which have not been realized by those known devices. Particular embodiments of the subject invention provide novel, inexpensive, and highly effective roasting platforms that can be adjusted for size and can stand alone without support from the pan or tray in which it is placed. One advantage of the roasting platform embodiments of the subject invention is that they can be made of well-known, inexpensive, recyclable materials, which makes them amenable to one-time use. The one-piece design also makes them suitable for production stamping or similar types of manufacturing processes. The use of one or more supports to inhibit collapse of the closed ends allows for a more flexible or lighter gauge material to be utilized. The use of flexible or lighter gauge material can also facilitate compression of the device into a smaller, compact size until use, at which time it can be deployed by expansion to a desired size and configuration.

Another advantage of the roasting platform embodiments of the subject invention is the incorporation of visual indicators. A compressed roasting platform can be pulled apart and the individual folds adjusted to achieve the desired expanded shape to support a food product. The visual indicators can be used to determine how far folds can be separated to achieve maximum distance without compromising the strength of the folds. One embodiment of a visual indicator crosses a peak and extends onto the sides of the fold. When expanding the roasting platform, the folds can be separated and expanded until the visual indicator foul's a particular shape. If the folds are separated too far, the shape will appear distorted to indicate that the folds need to be moved closer together. Likewise, if the folds are not separated enough, the shape of the visual indicator will not attain the particular shape. By way of example, an expansion indicator can be four-sided mark or stamp formed in a peak or valley. When the folds are pulled apart the correct distance, the four-sides can look like a square and if the folds are pulled too far apart they can look like a rectangle. Other shapes can also be used, such an oval that appears as a circle when the folds are the right distance apart. Visual indicators can also be openings or holes of one or more shapes within the valleys that can act as visual indicators and aid in draining rendered substances away from the food product. For example, there can be a four-sided hole in a valley that provides the same visual indication as the four-sided mark or stamp mentioned above.

It should be noted that this Brief Summary is provided to generally introduce the reader to one or more select concepts described below in the Detailed Disclosure in a simplified form. This Summary is not intended to identify key and/or required features of the claimed subject matter. Other aspects and further scope of applicability of the present invention will also become apparent from the detailed descriptions given herein. It should be understood, however, that the detailed descriptions, while indicating preferred embodiments of the invention, are given by way of illustration only, since various changes and modifications within the spirit and scope of the invention will become apparent from such descriptions. The invention is defined by the claims below.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed. Variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the accompanying drawings in which:

FIGS. 3A, 3B, and 3C are side elevation views of an embodiment of a roasting platform having tabs. FIG. 3A shows the tabs extended. FIG. 3B shows the tabs folded under the bottom side. FIG. 3C shows the tab end inserted into a drain hole.

FIG. 4 is a side perspective view of an embodiment of a roasting platform having stands for support.

FIGS. 5A, 5B, and 5C show an embodiment of a stand according to the subject invention.

FIG. 6 is a side elevation view of a roasting platform and stands shown in multiple positions.

FIGS. 7A and 7B are side elevation views of embodiments of a roasting platform according to the subject invention. In these embodiments, the upward peaks are different heights.

FIG. 8 is a side elevation view of an embodiment of a roasting platform according to the subject invention. In this embodiment, the bottom peaks are different heights.

FIG. 9 is a side perspective view of an embodiment of two roasting pans according to the subject invention, where the roasting pans have been overlapped along their open ends.

FIGS. 10A, 10B, and 10C are top plan sectional views of drain hole embodiments according to the subject invention. In these embodiments, the drain hole spans two folds. FIG. 10A shows the drain hole appearance when the folds are expanded too far. FIG. 10B shows the appearance of the drain holes when the holes are correctly expanded. FIG. 10C shows the appearance of the drain holes when the folds are not expanded far enough.

FIGS. 11A, 11B, and 11C are top plan sectional views of drain hole embodiments according to the subject invention. In these embodiments, the drain holes are in a single fold. FIG. 11A shows the drain hole appearance when the folds are expanded too far. FIG. 11B shows the appearance of the drain holes when the holes are correctly expanded. FIG. 11C shows the appearance of the drain holes when the folds are not expanded far enough.

DETAILED DISCLOSURE

Figure 1A:
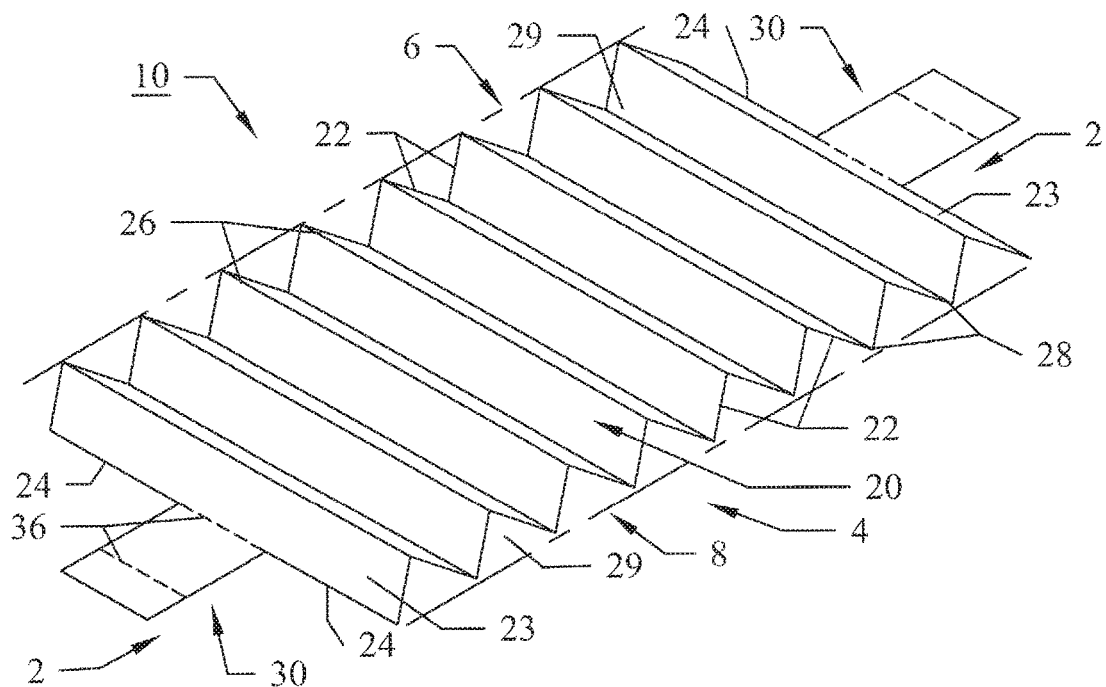
FIG. 1A is a perspective view of an embodiment of a roasting platform, according to the subject invention, that is deployed for use.

The subject invention pertains to devices for cooking or roasting food. More specifically, the subject invention provides one or more embodiments of a roasting platform, or similar device, for use in supporting food products above the oils, fats, liquids, juices, gases, or other substances that may come from cooking food.

The following description will disclose that the subject invention is particularly useful for cooking food in conventional ovens or on open pits or barbeque pits. Embodiments can also be used in a pan or tray, where rendered substances can be collected, if desired. However, a person with skill in the art will be able to recognize numerous other uses that would be applicable to the devices and methods of the subject invention. While the subject application describes, and many of the terms herein relate to a use for cooking food, other modifications apparent to a person with skill in the art and having benefit of the subject disclosure are contemplated to be within the scope of the present invention.

As used herein, the phrase "rendered substances" refers to oils, fats, liquids, juices, gases, or any other substances that may be cooked out, rendered, melted, steamed, or otherwise released from an item or food product.

Further, as used herein, the terms "item" and "food products" are used interchangeably for literary convenience to refer to objects that can be placed on the top-side of a roasting platform of the subject invention. While this can include objects that are food or food-related, the subject invention is not limited to only uses for cooking food.

Also, as used herein, and unless otherwise specifically stated, the terms "operable communication," "operable connection," "operably connected," "cooperatively engaged" and grammatical variations thereof mean that those particular elements are connected in such a way that they cooperate to achieve their intended function or functions. The "connection" or "engagement" may be direct or indirect.

Reference is made herein to the "open-end" and the "closed end" of a roasting platform. An open-end refers to an edge of the roasting platform that is perpendicular to the folds or peaks of the roasting platform. When the roasting platform is viewed from an open-end, the edge appears as a repeating "M"-shape. Conversely, the closed-end refers to an edge of the roasting platform that is parallel with the folds or peaks of the roasting platform. When the roasting platform is viewed from a closed-end a last fold directed towards the bottom side can be seen as a flat surface.

Finally, reference is made throughout the application to the "top-side" and "bottom-side." As used herein, the top-side is that side which is nearest to food or other items placed on the roasting platform. Conversely, the bottom-side of the device is the side that is opposite to a food product or item placed on the roasting platform or that side placed nearest to, or against, a pan, tray or cooking surface.

The present invention is more particularly described in the following examples that are intended to be illustrative only since numerous modifications and variations therein will be apparent to those skilled in the art. As used in the specification and in the claims, the singular for "a," "an" and "the" include plural referents unless the context clearly dictates otherwise.

Reference will be made to the attached figures on which the same reference numerals are used throughout to indicate the same or similar components. With reference to the attached figures, which show certain embodiments of the subject invention, it can be seen in FIG. 1 that a roasting platform 10 of the subject invention comprises at least one sheet 20 having multiple folds 22 that form a plurality of upward peaks 26 that define a top side 6 and a plurality of downward peaks 28 that define a bottom side 8, with a valley 29 between each upward and each downward peak. At each closed-end 2 of the roasting platform, where the last fold 23 forms a peak in the sheet, there can be one or more tabs 30 formed at the terminal edge 24 of the last fold. Alternatively, one or more stand members 40 can be utilized with a roasting platform. A stand member, such as shown, for example, in FIGS. 5A-FIG. 6, can be a U-shaped or similarly-shaped device having at least two legs 42 that can be upwardly disposed and joined by a connecting piece 44. Each of these general components can have one or more sub-components, which will be discussed in detail below.

One or more materials can be employed for the embodiments of a roasting platform 10, according to the subject invention. The one or more materials can be such that components of the subject invention can be formed by known manufacturing techniques, methods, and procedures, such as, for example, stamping, cutting, punching, molding, roller formed, and extrusion. In one embodiment, a roasting platform is formed or cut from a larger sheet, panel, or mass of the one or more materials. By way of non-limiting example, an embodiment of a roasting platform 10 can be formed as a single sheet of material, wherein the sheet 20 and tabs 30 thereon can be manufactured, cut, or otherwise provided as a single, contiguous form. The sheet can be manipulated during the manufacturing process to form folds that provide the peaks and valleys. This does not preclude the sheet and tabs being formed separately and connected to the roasting platform.

The material utilized can be amenable to folding and sufficiently pliable that it can be manipulated by hand, whereby the folds and other components of a roasting platform can be, for example, bent or expanded by pulling or stretching or rotating one or more sections to the desired configuration and dimensions. Thus, the material can be such that it allows a roasting platform to be customized or adjustable to the desired dimensions and is able to substantially retain that configuration. It can be preferable for the material to be heat resistant or heat stable, such that it resists melting, relaxing, collapsing, or otherwise deforming when subjected to temperatures typically utilized for cooking food items. This does not preclude embodiments of the subject invention being usable in colder temperatures. The material can also be such that it allows for defined, sharp peaks to be formed, which can minimize contact with the food item. It can be beneficial, though not required, for the material to be substantially or entirely non-absorbent. A roasting platform can be of a single material or two or more materials combined or joined together. Such materials can include, but are not limited to, metals, such as aluminum, steel, copper, brass, and tin; plastics, such as nylon, PVC; silicone; rubber; glass; ceramics; wood, wood pulp, or wood fiber products; and other suitable materials or any of various combinations thereof. In one embodiment, aluminum or an aluminum-alloy is used having a thickness between approximately 0.006 ml and approximately 1.0 ml. In another embodiment, aluminum or aluminum alloy is used having a thickness of between approximately 24 gauge and approximately 30 gauge. In a particular embodiment, a food grade aluminum can be used, such as that often used for disposable roasting or chafer pans. This is often referred to as "heavy grade aluminum."

Figure 1B:
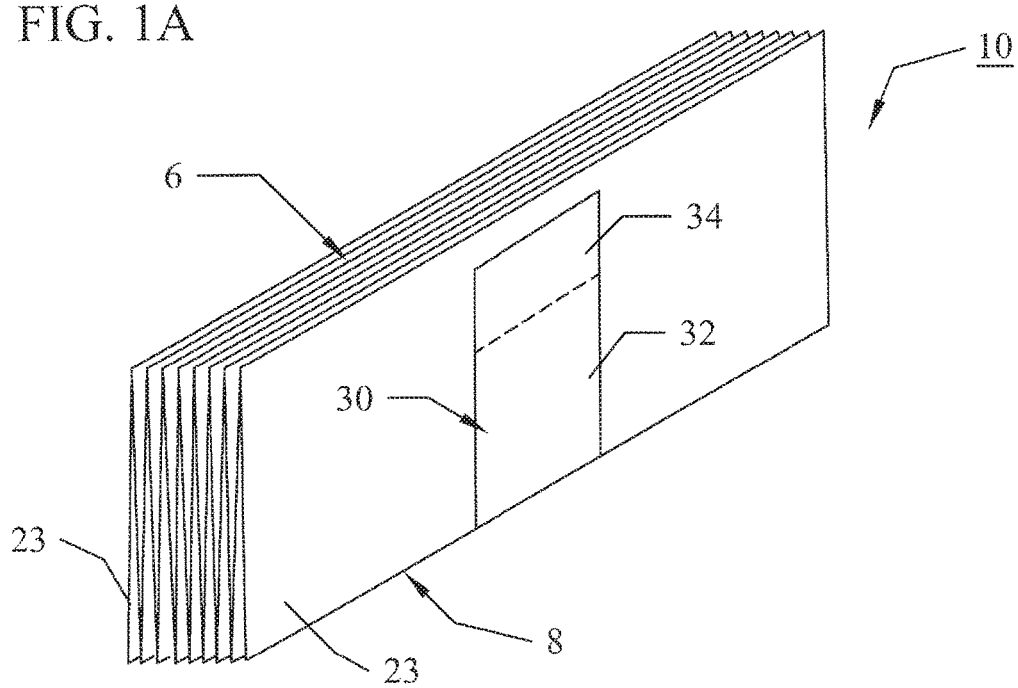
FIG. 1B is a perspective view of an embodiment of a roasting platform, according to the subject invention, in a compressed state.

In one embodiment, a roasting platform 10 is a sheet of material with multiple folds 22 that form upward peaks 26 and lower peaks 28 in the sheet, such as shown, for example, in FIG. 1. The upward peaks 26 can together form a top side 6, on which a food product can be placed. In one embodiment, the upward peaks are all identical, or at least similar, in height, such that there is a substantially planar top side 6. One non-limiting example of this is shown with a dashed line in FIG. 1A. In an alternative embodiment, the upward peaks can be of differing heights, such that the top side has variable heights and is not a substantially planar surface. With this embodiment, the upward peaks can alternate in height, such as shown in FIGS. 7A and 7B. The upward peaks could also be graduated in height towards the center or the ends of the roasting platform, as shown in FIGS. 7A and 7B. Such alternative embodiments can be useful when items placed thereon are inconsistent in shape. The upward peaks of less height can also provide additional strength to support adjacent upward peaks of greater height.

Opposite to the upward peaks, there can also be downward peaks 28 that combined form a bottom side 8 to support the roasting platform against a surface. As with the upward peaks, the downward peaks can all be identical, or at least similar in height, such that there is a substantially flat bottom side 8, as indicated by a dashed line in FIG. 1A. Alternatively, the downward peaks can be of differing heights, such that the bottom surface is not a substantially flat surface. With this embodiment, the downward peaks can alternate in height, such as shown in FIG. 8. The downward peaks could also be graduated in height towards the center of the roasting platform, as shown in FIG. 8. Such embodiments can be useful on surfaces or in cooking utensils that do not have flat surfaces, but are bowl-shaped, so that the roasting platform can make contact with a curved surface. The downward peaks could have other arrangements or configurations of differing heights. In a particular embodiment, the downward peaks are configured to conform to the curved surface and the upward peaks are configured to simultaneously form a planar top side.

In another embodiment, there could be a combination of upward peaks 26 and downward peaks 28 with differing heights, such as described above, to accommodate any of a variety of food products, surfaces, cooking utensils, or pan shapes. It may be preferable to have higher peaks on the top side, to maximize the distance of the item from any rendered substances. A person with skill in the art will be able to determine the appropriate heights for the upward peaks and downward peaks. Variations in the height of upward peaks and/or downward peaks that provide the same or improved functionality, in substantially the way as described herein, with substantially the same desired results, are within the scope of this invention.

In a further embodiment, the folds form sharp or at least minimally curved peaks, as seen, for example in FIGS. 1A, 2, 3A, 3B, and 3C. The sharpness or lack of curvature of the peaks can lend rigidity to the material in that area, which can increase the overall strength of the structure and can further minimize sagging, separation, bending, or other types of deformation of the peaks when items are placed thereon. In other words, the peaks can hold their shape and position. In a still further embodiment, between each of any two peaks there can be a valley 29. The valley can be the V-shaped space between two upward peaks or, conversely, the V-shaped space between two downward peaks. Advantageously, the sharpness of the peaks and the valleys in-between can allow a roasting platform to be compressed along the longitudinal length LL, such that the peaks can be brought into close proximity or in contact with each other, as shown, for example, in FIGS. 1B and 2. This results in a compact, compressed form that minimizes packaging and storage requirements. It can also maintain the integrity of the peaks and inhibit crushing of the roasting platform. For use, the roasting platform can be deployed for use by expanding, whereby the folds can be pulled apart or manipulated, so that they are separated and evenly, or approximately evenly, spaced.

Embodiments of a roasting platform, when expanded and secured for use, can be used to support a food item placed directly thereon weighing at least 0.2 lb., 0.5, 0.7 lb., 1 lb., 1.5 lb., 2 lbs., 2.5 lbs., 3 lbs., 3.5 lbs., 4 lbs., 4.5 lbs., 5 lbs., 5.5 lbs., 6 lbs., 6.5 lbs., 7 lbs., 7.5 lbs., 8 lbs., 8.5 lbs., 9 lbs., 9.5 lbs., 10 lbs., and 10.5 lbs. or having a weight in a range between any two of the listed values. More than one roasting platform can be utilized for heavier food items. Two or more roasting platforms can also be used to create a larger roasting area. Roasting platforms, when expanded, can be overlapped, such that a portion of a surface of one roasting platform overlaps a portion of a surface of another roasting platform. This can allow the peaks and valleys of one roasting platform to nestle, couple, or interdigitate with the peaks and valleys of another roasting platform at one or both of a closed-end 2 and at an open-end 4. FIG. 9 illustrates one non-limiting example of two overlapping roasting platforms. Overlapping roasting platforms can be used for larger items can also provide additional strength to support heavier items.

The dimensions of a roasting platform 10 can be such that for most purposes one can be used alone in a pan or tray. But, when necessary, multiple roasting platforms can be used side by side, or overlapping, as described above. In one embodiment, a deployed roasting platform, that is, one that has been expanded or extended from a compressed or collapsed state, has square dimensions, such that the closed-end 2 and open-end 4 have the same or approximately, the same length. In another embodiment, a deployed roasting platform has rectangular dimensions, such that the closed-end and the open-end are different lengths. Whether the roasting platform is square or rectangular, the lengths of either or both the closed-end 2 and the open-end 4 can be between approximately 4" and approximately 12," when the roasting platform is deployed for use. Alternatively, whether the roasting platform is square or rectangular, the lengths of either or both the closed-end 2 and the open-end 4 can be between approximately 5" and 10," when the roasting platform is deployed for use. In a further alternative, whether the roasting platform is square or rectangular, the lengths of either or both the closed-end 2 and the open-end 4 can be between approximately 6" and 9," when the roasting platform is deployed for use. In a specific alternative, the lengths of either or both the closed-end and the open-end of the roasting platform are between approximately 7" and approximately 8," when the roasting platform is deployed for use.

Cooking pans and trays are not always square or rectangular and can be round or oval and can also have non-flat or curved bottoms. Because the roasting platform embodiments of the subject invention can be formed from a pliable, foldable, bendable, or otherwise adjustable material, a roasting platform can be altered to fit into different size pans and trays. For example, the corners of a roasting platform could be curved, such that the deployed roasting platform has a round or oval shape to accommodate rounded corner pans or trays. Alternatively, the materials that can be utilized for a roasting platform can be cut or trimmed with scissors. For example, a roasting platform made of heavy grade aluminum or aluminum alloy, such as that used for disposable food cooking or service pans, can be trimmed or cut along the sides or corners to create a roasting platform sized to fit a particular pan or tray. For example, kitchen scissors can be used for trimming a roasting platform.

While adjacent folds 22 can provide strength to the roasting platform, the folds nearer to the closed-ends 2 can be susceptible for sagging or collapsing, particularly the last fold 23 at each closed-end, where there is no adjacent fold on one side. It can be beneficial for the closed-ends to be further supported to maintain the shape and form of the roasting platform. Supporting the closed-ends can ensure that the entire top-side is usable and inhibits a "domino effect" of the closed-ends sagging or collapsing, which can sequentially compromise the integrity of the other folds.

In one embodiment, a terminal edge 24 of the last fold 23 at a closed-end 2 can have at least one tab 30 attached thereto. The tab can be permanently attached at or about the terminal edge, such as shown, by way of example, in FIGS. 1A, 1B, and 2. In one embodiment, a tab has a span 32 and an insert end 34. The material of the tab can allow the tab to be bent under the bottom side 8. In a further embodiment, a tab has one or more fold lines 36 where the material of the tab is scored, stamped, marked, perforated or otherwise made easier to being folded. When the roasting platform is compressed, such as shown, by way of example, in FIG. 1B, a tab can be folded towards the top-side 6 so that it is next to or parallel with a last fold 23 of a roasting platform. Alternatively, a tab can extend out and away from the top-side or from the last fold 23, when the roasting platform is compressed.

Figure 2:
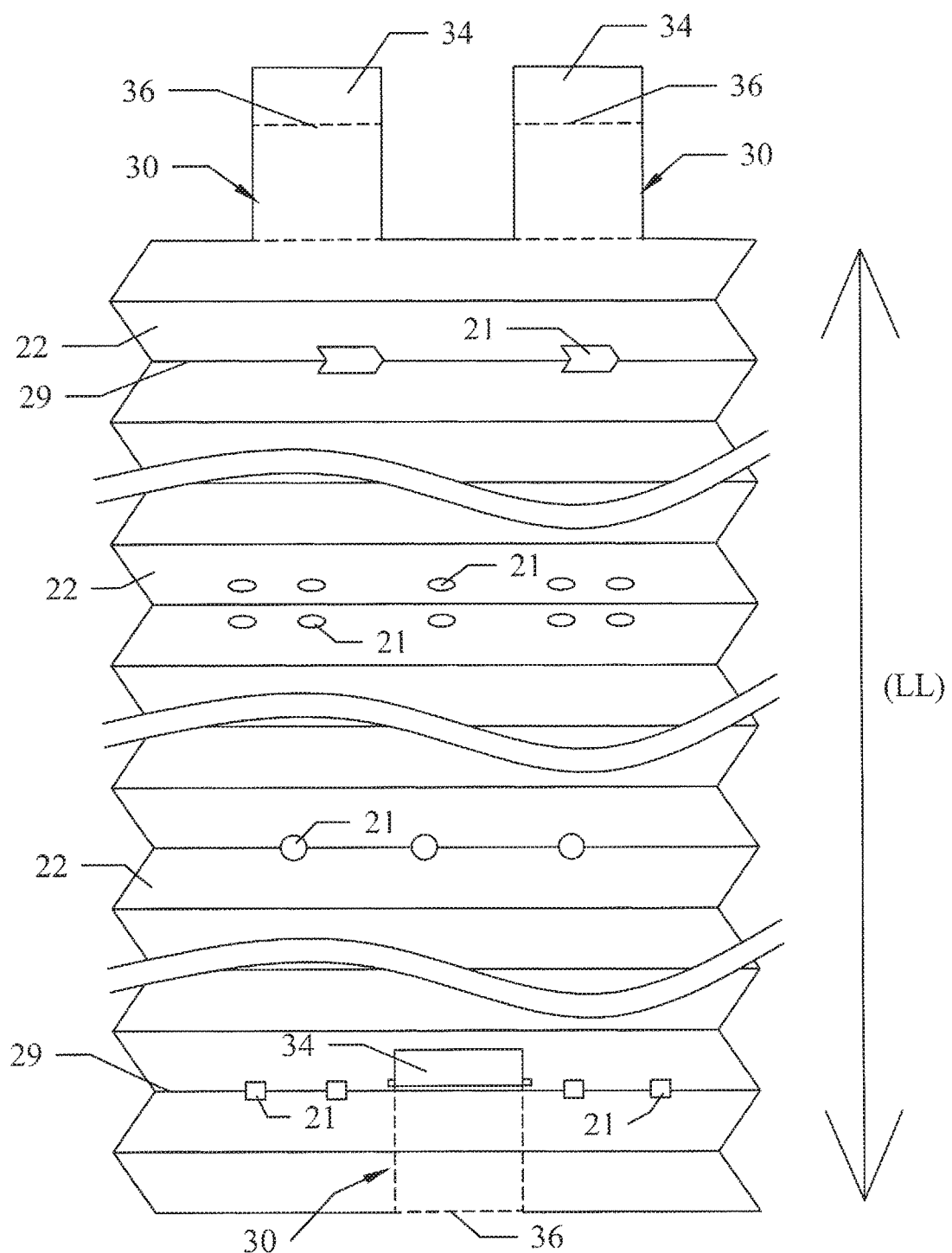
FIG. 2 is a top plan view of multiple embodiments of drain holes in a roasting platform.

When the roasting platform is deployed for use, as shown in FIGS. 1A and 2, the at least one tab 30 can be folded towards the bottom-side 8, such as shown, by way of example, in FIGS. 3A and 3B. In one embodiment, there is at least one fold-line 36, at, or near to, where the tab attaches to the terminal edge 24, to facilitate folding of the tab towards the bottom-side 8. When the tab is folded towards the bottom-side, the span 32 can cross the valley 29 on the bottom side 8 between the last fold 23, at the terminal edge 24, and an adjacent fold 22, which is demonstrated in FIGS. 3B and 3C. This can situate the insert end 34 within the next adjacent valley. In other words, the length of the tab 30 allows the span 32 to cross the valley adjacent to the terminal edge and extend the insert end 34 into the next valley. The insert end 34 can also be bent upwards, so that it points into the valley and towards the top-side 6, which is demonstrated in FIG. 3B. In one embodiment, there is another fold-line 36 between the span and the insert end that to facilitate folding of the insert end. The insert end, when bent upwards, can act as a buttress or brace that inhibits the last fold 23 closed end from expanding any further, thus also inhibiting sagging, bending, curling, collapsing or other undesirable deformation of the terminal edge 24 or the closed-end 2 of the roasting platform.

In an alternative embodiment, a stand 40 is used to support the terminal edge. A stand can provide the same or similar benefits and advantages as those of a tab 30, without being permanently attached to the roasting platform. Thus, the stand can be a separate piece or component that can be used with a roasting platform. A stand can be of the same material as the roasting platform. Alternatively, the stand can be one or more different materials than the material of the roasting platform. Preferably, the stand, like the tab, is heat resistant, heat tolerant, or is otherwise capable of withstanding at least the temperatures under which the roasting platform can function.

A stand 40 can be placed under the bottom-side 8 of a roasting platform 10 and used to support a last fold 23 and an adjacent downward peak, similarly to a tab, to inhibit the last fold from expanding too far from the adjacent peak. In fact, more than one stand can be used on the bottom side to lend further support to other areas. FIG. 4 illustrates an example where multiple stands are placed not only to support the last fold 23, but also to lend support between two other downward peaks. The use of stands in other areas on the bottom side can allow heavier items to be placed on a roasting platform, without causing the peaks to collapse or expand too far apart.

In one embodiment, a stand 40 has at least two braces 42 joined by a connector 44. The braces can extend upwards from opposite ends of the connector, to form a half-square or "U" or a similar shaped device. The braces can be, but are not required to be parallel with each other. The last fold and at least one adjacent peak can be placed on the connector and between the two braces. The last fold and the at least one peak can abut or push against the braces, which act as buttresses to inhibit the last fold from spreading or expanding further than the distance between the braces. FIG. 6 illustrates one non-limiting example of a stand 40 with two braces and a connector, with a last fold 23 and an adjacent downward peak 28 placed between the braces. It can be seen in FIG. 6 that the braces do not have to be parallel to inhibit spreading or expanding of the last fold and the downward peak. Nor do the braces have to be parallel to inhibit spreading or expanding of any two other downward peaks.

As mentioned above, it can advantageous for a roasting platform to be compressible or foldable, for easier shipping and storage. Thus, it can also be advantageous if a stand can be collapsible or compressible. In one embodiment, the stand is a flat piece that can be bent or folded in at least two places to form at least one brace at either end. As with a tab, there can be one or more fold lines 36 where the stand can be bent to form the upward braces 42. FIGS. 5A, 5B and 5C illustrate one non-limiting example of this embodiment, where FIGS. 5A and 5B show a top-side 6 view and an open-end 4 view, respectively, of a stand in a flattened state and FIG. 5C shows the braces bent upwards along the fold lines 36 seen in FIG. 5A. In an alternative embodiment, a stand can be pre-configured with the braces bent into the necessary positions.

Rendered substances that remain near food products can cause a steaming effect that prevents or lessens the ability of the food to brown or crisp in that area. Raising the food product above the surface, with a roasting platform according the subject invention can inhibit this effect. The rendered substances can drain away in the valleys 29 from a food item supported on the upward peaks 26. Increasing the speed at which the rendered substances are removed from proximity to a food product can also be helpful.

In one embodiment, valleys can have one or more drain holes 21 that allow rendered substances to move out of the valleys faster, so that it is under the bottom-side of the roasting platform. The drain holes can allow rendered substances to flow away from under the item on the roasting platform. FIG. 2 illustrates an example of a roasting platform with different shapes of drain holes. Some of the drain holes go across the downward peaks others do not and are holes or openings in one fold. In a particular embodiment, a drain hole shape is complementary with the insert end 34 on a tab 30 or the braces 42 on a stand 40. This complimentary shape allows the insert end or the braces to be inserted through a drain hole to provide additional support to a roasting platform. FIG. 2 illustrates a non-limiting example of an insert end 34 on a tab inserted into a drain hole 21 sized to fit the insert end. FIG. 6 illustrates other non-limiting examples of braces 42 inserted through drain holes 21 in a roasting platform.

When a folded or compressed roasting platform is deployed for use, the drain holes can be opened and exposed for view within the valleys. Advantageously, the drain holes can be used as visual indicators when deploying a compressed roasting platform. By configuring a drain hole in a specific shape, such as, for example, as an oblong bilateral shape, the drain holes can indicate when the folds of a compressed roasting platform are pulled apart to the correct distance between peaks. By viewing the drain holes from the top-side 6 or the bottom-side 8, the visual shape of the drain holes can indicate how far apart to pull or manipulate the folds.

In one embodiment, a drain hole 21 is configured as an oblong bilateral shape, for example an oval or rectangle, that extends perpendicularly across a downward peak 28, so that is appears at the bottom of a valley and crossing two folds 22, as shown, for example, in FIG. 10A. When the folds that form the downward peak are pulled the correct distance apart, the drain hole can appear as a symmetrical shape, for example, a square or a circle, as shown in FIG. 10B. However, if the folds that form the peak are pulled too far apart, the drain holes can appear as an oblong shape, such as an oval or rectangle. If the folds are not pulled far enough apart the drain holes can appear distorted and not as the symmetrical shape. For example, a drain hole can appear to look like a reversed, smaller version of the oblong shape, as shown in FIG. 10C, if it is not pulled a sufficient distance apart from another fold. In other words, as the folds are pulled apart to widen the valley between them, the shape of the drain hole will appear to change when the roasting platform is viewed directly from either the top-side or the bottom-side. When a drain hole appears as a symmetrical shape, such as, by way of example a circle, square, equilateral triangle, or other shape, the folds are spaced at the proper distance for maximum weight support by the peaks. In one embodiment, there is at least one drain hole in each valley. In an alternative embodiment, there is at least one drain hole in the roasting platform, which can be used to determine the proper expansion between two folds. Other folds can then be expanded similarly.

In an alternative embodiment, a drain hole is configured as an oblong bilateral shape, for example an oval or a rectangle within a single fold, such as shown, for example, in FIG. 11A. When the fold is pulled the correct distance apart from another fold, the drain hole can appear as a symmetrical shape, such as a square or circle, when viewed from the top-side 6 or the bottom-side 8, as shown in the example in FIG. 11B. If the fold is pulled too far, the drain hole can appear as an oval or a rectangle, when the roasting platform is viewed from the top-side or the bottom-side. If the fold is not pulled far enough, the drain hole can appear distorted and not as a symmetrical shape. For example, if the fold is not expanded far enough away from another fold a drain hole can appear as an oblong shape in the fold, as shown, by way of example, in FIG. 11C. In other words, as the fold is expanded by being pulled away from the adjacent fold, the shape of the drain hole appears to change when the roasting platform is viewed directly from either the top-side or the bottom-side. When a drain hole appears as a symmetrical shape, such as, by way of example a circle, square, equilateral triangle, or other shape, the folds are spaced at the proper distance for maximum weight support by the peaks. In one embodiment, there is at least one drain hole in each fold. In an alternative embodiment, there is at least one drain hole in the roasting platform, which can be used to determine the proper expansion between two folds. Other folds can then be expanded similarly.

The examples and embodiments described herein are for illustrative purposes only and that various modifications or changes in light thereof will be suggested to persons skilled in the art and are to be included within the spirit and purview of this application.

Any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

The invention has been described herein in considerable detail, in order to comply with the Patent Statutes and to provide those skilled in the art with information needed to apply the novel principles, and to construct and use such specialized components as are required. However, the invention can be carried out by specifically different equipment and devices, and that various modifications, both as to equipment details and operating procedures can be effected without departing from the scope of the invention itself. Further, although the present invention has been described with reference to specific details of certain embodiments thereof and by examples disclosed herein, it is not intended that such details should be regarded as limitations upon the scope of the invention except as and to the extent that they are included in the accompanying claims.

The invention claimed is:

1. A roasting platform comprising:
   a sheet configured with upwards folds and downward folds that form a plurality of valleys, such that there is a last fold at each end with a terminal edge directed towards a bottom side of the sheet, so that each last fold forms a closed end, wherein the upward folds, downward folds and last folds are expandable from a compressed position;
   one or more tabs attached to the terminal edge of each last fold, where the tab has a span and an insert end and is foldable across the bottom side, so that the span crosses at least one downward peak and the insert end inserts into an adjacent valley, so as to inhibit the at least one downward peak crossed by the span from spreading or expanding past the insert end; and
   at least one drain hole in at least one of the upward folds and the downward folds, the drain hole having a shape that appears to change when the upward fold and downward fold are expanded, thereby providing a visual indication for determining the distance to expand the upward folds and downward folds, such that, when expanded to the correct distance, the at least one drain hole is opened and the upward folds, downward folds, and last folds can support a weight placed thereon.

2. The roasting platform, according to claim 1, wherein the sheet comprises a material that allows the upward peaks, downward peaks, and last folds to be expanded by manual manipulation.

3. The roasting platform, according to claim 2, wherein the sheet comprises aluminum or an aluminum alloy.

4. The roasting platform, according to claim 1, wherein the at least one drain hole has a shape that crosses two folds of a downward peak, wherein the shape appears to change when the two downward folds are expanded, such that the change in appearance of the shape indicates when the two folds are expanded to a correct distance apart.

5. The roasting platform, according to claim 1, wherein the insert end further inserts into the at least one drain hole.

6. The roasting platform, according to claim 1, wherein the shape of the at least one drain hole appears to be a circle, square, or equilateral triangle when the downward folds are expanded to the correct distance.

7. The roasting platform, according to claim 1, further comprising a closed end and an open end that have similar lengths when the roasting platform is expanded.

8. A roasting platform comprising:
   a sheet configured with upwards folds and downward folds that form a plurality of valleys, such that there is a last fold at each end with a terminal edge directed towards a bottom side of the sheet, so that each last fold forms a closed end, wherein the upward folds, downward folds and last folds are expandable from a compressed position;
   at least one drain hole in at least one of the upward folds and the downward folds that opens and appears to change shape when the at least one of the upward fold and the downward fold is expanded to provide a visual indication for determining a correct expansion distance r the at least one of the upward folds and downward folds; and
   at least one stand having at least two braces joined by a connector, where the stand is placed across the bottom side, so that the connector crosses a last fold and a downward peak, so as to brace against and inhibit the last fold and the downward peak from spreading or expanding past the braces, so that the upward folds, downward folds, and last folds can support a weight placed on the upwards folds.

9. The roasting platform, according to claim 8, wherein the sheet comprises a material that allows the upward peaks, downward peaks, and last folds to be expanded by manual manipulation.

10. The roasting platform, according to claim 9, wherein the sheet comprises aluminum or an aluminum alloy.

11. The roasting platform, according to claim 8, further comprising at least one other stand placed across the bottom side, so that the span crosses at least two downward peaks, so as to inhibit the at least two downward peaks from expanding past the braces.

12. The roasting platform, according to claim 8, wherein the at least one drain hole has a shape that crosses two folds of a downward peak, wherein the shape appears to change when expanded to indicate when the two folds are expanded a correct distance apart.

13. The roasting platform, according to claim 8, wherein one of the at least two braces further inserts into the at least one drain hole.

14. The roasting platform, according to claim 8, wherein the shape of the at least one drain hole appears to be a circle, square, or equilateral triangle when the downward folds are expanded to the correct distance.

15. The roasting platform, according to claim 8, further comprising a closed end and an open end that have similar lengths when the roasting platform is expanded.

\* \* \* \* \*